United States Patent
Petit et al.

(10) Patent No.: US 7,141,942 B2
(45) Date of Patent: Nov. 28, 2006

(54) DIGITAL DEVICE FOR CORRECTING THE IMAGE FORMED ON THE SCREEN OF A CATHODE RAY TUBE

(75) Inventors: Michel Petit, Biarne (FR); Jean-Luc Bellanger, Gevry (FR); Patrice Perdriset, Ladoix-Serrigny (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/518,277

(22) PCT Filed: Jun. 12, 2003

(86) PCT No.: PCT/EP03/50224

§ 371 (c)(1),
(2), (4) Date: Dec. 15, 2004

(87) PCT Pub. No.: WO04/002133

PCT Pub. Date: Dec. 31, 2003

(65) Prior Publication Data
US 2005/0231136 A1 Oct. 20, 2005

(30) Foreign Application Priority Data
Jun. 20, 2002 (FR) .................................. 02 07647

(51) Int. Cl.
*G09G 1/04* (2006.01)
(52) U.S. Cl. ....................... 315/370; 315/367; 315/369
(58) Field of Classification Search ................ 315/364, 315/367, 399, 370, 369, 403
See application file for complete search history.

(56) References Cited

U.S. PATENT DOCUMENTS 4,010,476 A * 3/1977 Elliott .................. 346/33 WL (Continued)

FOREIGN PATENT DOCUMENTS

EP 324991 7/1989

(Continued)

OTHER PUBLICATIONS

Patent Abstracts of Japan, vol. 017, No. 680, Dec. 14, 1993 & JP 05-227536 (See Ref. AD.

(Continued)

*Primary Examiner*—Tan Ho
*Assistant Examiner*—Tung Le
(74) *Attorney, Agent, or Firm*—Joseph J. Laks; Harvey D. Fried; Richard LaPeruta

(57) ABSTRACT

Device for correcting the line and/or frame fields of a deflector for cathode ray tube comprising:
a current sensor for evaluating the value of a line current Il
a series of comparators intended to compare the value of the line current Il with reference values
a current sensor for evaluating the value of the frame current It
an analogue/digital converter for converting the analogue value of the frame current
a programmed correction memory which is addressed by the output signals from the comparators and from the analogue/digital converter so as to deliver to at least one digital/analogue converter, data which are dependent on the addressing signals
a low-pass filter for filtering the output of the digital/analogue converter
at least one correction coil for correcting the deflection fields of the deflector, and generating a correction field as a function of the output value from the low-pass filter.

4 Claims, 2 Drawing Sheets

U.S. PATENT DOCUMENTS

| | | | | |
|---|---|---|---|---|
| 4,672,449 | A | * | 6/1987 | Kraus et al. ................ 348/511 |
| 4,820,977 | A | * | 4/1989 | Brust ......................... 324/751 |
| 4,980,614 | A | * | 12/1990 | Yamada et al. ........ 315/368.13 |
| 5,059,872 | A | * | 10/1991 | Matsumi et al. ....... 315/368.12 |
| 5,161,002 | A | * | 11/1992 | Rodriguez-Cavazos et al. ......................... 348/445 |
| 5,652,482 | A | * | 7/1997 | Tripod ....................... 315/370 |
| 5,663,615 | A | * | 9/1997 | Ogino ........................ 315/371 |
| 5,712,532 | A | * | 1/1998 | Ogino et al. .................... 315/1 |
| 5,734,233 | A | * | 3/1998 | Masumoto et al. .... 315/368.12 |
| 6,359,398 | B1 | * | 3/2002 | Nakajima et al. ........... 315/369 |
| 6,534,920 | B1 | * | 3/2003 | Uwabata et al. ................ 315/1 |
| 6,545,435 | B1 | * | 4/2003 | Muraguchi et al. ......... 315/370 |
| 2004/0125243 | A1 | * | 7/2004 | George ...................... 348/745 |

FOREIGN PATENT DOCUMENTS

| | | |
|---|---|---|
| EP | 416289 | 3/1991 |
| EP | 529570 | 3/1993 |
| JP | 57-010593 | 1/1982 |
| JP | 61-012191 | 1/1986 |
| JP | 05-227536 | 9/1993 |

OTHER PUBLICATIONS

Patent Abstracts of Japan, vol. 006, No. 072, May 7, 1982 & JP 57-010593 (See Ref. AE).

Patent Abstracts of Japan, vol. 010, No. 158, Jun. 6, 1986 & JP 61-012191 (See Ref. AF).

Search Report Dated Sep. 25, 2003.

* cited by examiner

DIGITAL DEVICE FOR CORRECTING THE IMAGE FORMED ON THE SCREEN OF A CATHODE RAY TUBE

This application claims the benefit, under 35 U.S.C. § 365 of International Application PCT/EP03/50224, filed Jun. 12, 2003, which was published in accordance with PCT Article 21(2) on Dec. 31, 2003 in English and which claims the benefit of French patent application No. 0207647, filed Jun. 20, 2002.

The present invention pertains to a system for correcting the distortions of the image created on the screen of a cathode ray tube as well as to the method for correcting these distortions.

Nowadays, cathode ray tubes have an ever flatter, or indeed completely flat, face plate. The inner surface of the said face plate on which the luminescent screen is deposited is then itself flat, thereby giving rise to image distortions created on the screen. For so-called auto-convergent tubes, the convergence of the three electron guns is difficult to achieve through the astigmatism of the deflection fields, and also the geometry of the image. Moreover, the present trend is aimed at increasing the definition of the image and in reducing the depth of the cathode ray tubes, thereby complicating the situation and so no longer allowing the deflection fields to ensure the convergence of the electron beams, the uniformity of the colours over the whole screen and the geometry of the image. Moreover, the constraints related to an increase in definition and to a decrease in depth give rise to considerable variability of production which is incompatible with the image qualities demanded. So it is therefore necessary to be able to make available an additional correction system which can be tailored for each tube.

Moreover, the variability in production of the deflection devices for the electron beams of tubes cannot be significantly decreased; this variability, acceptable hitherto, is no longer so for tubes of small depth and/or high definition.

An additional electromagnetic device incorporated with the conventional deflection system will therefore be necessary in order to correct the performance of this new generation of tubes. This device will offer cartographic correction of the display of the image and will be able to act on the geometry, the convergence and/or the uniformity of the colours by modifying the points of impact of the electron beams on the screen, by modifying the line and frame deflection fields.

To synchronize the correction with the displaying of the image, the principles generally used are either of temporal type (the corrections are generated from line and frame synchronization signals or of positional type (the correction is related to the value of the line and frame currents which represent the position of the points of impact of the electron beams on the screen).

The temporal cartographic correction offers the advantage of simplicity, but it is strongly related to the tube scanning frequency and to the television manufacturer since the correction device needs the television's electronic chassis line and frame synchronization signals, as well as information regarding the format of the image.

The positional correction is not related to the tube scanning frequency, this presenting an advantage of integration for television manufacturers. It requires only a supply from the electronic chassis of the television.

The invention proposes a correction of positional type and the objective thereof is to provide a low cost, simple to implement correction method and device offering a correction free of instability visible to the viewer.

For this purpose the device for correcting the line and/or frame fields of a deflector for cathode ray tube comprises:

a current sensor for evaluating the value of the line current a series of comparators intended to compare the value of the line current with reference values a current sensor for evaluating the value of the frame current an analogue/digital converter for converting the analogue value of the frame current a programmed correction memory which is addressed by the output signals from the comparators and from the analogue/digital converter so as to deliver to at least one digital/analogue converter, data which are dependent on the addressing signals.

a low-pass filter for filtering the output of the digital/analogue converter at least one correction coil for correcting the deflection fields of the deflector, generating a correction field as a function of the output value from the low-pass filter.

The invention and its various advantages will be better understood with the aid of the following description and of the drawings among which:

The positional correction requires the reading in digital form of the values of the line and frame scan currents so as to assign the corresponding corrections.

The correction values are stored in a memory which can be addressed directly by the values of the line and frame currents.

The corrections in digital form are assigned to the devices for magetic correction via a digital/analogue converter.

Thus, for a specified family of tubes, it is possible to prerecord correction values in the correction memory as a function of characteristics of the deflection system used; this makes it possible to simplify the design of the said deflection system which will no longer have, for example, to ensure 100% convergence of the electron beams, optimization of the geometry of the image on the screen, etc.

It is also possible to use this type of correction, this time tube by tube, to correct the scatter in performance due to production variabilities.

It is essential however that the correction system not give rise to correction instabilities which are visible to the eye of the user.

The solution generally used consists in asynchronous reading of the scanning currents with a high sampling frequency and correction resolution so that the asynchronism does not create any instability visible to the eye on the screen.

This solution requires the use of a top of the range analogue/digital converter with a sampling frequency of the order of 10 MHz addressing a memory with a resolution of 256 corrections per line.

Figure 1:
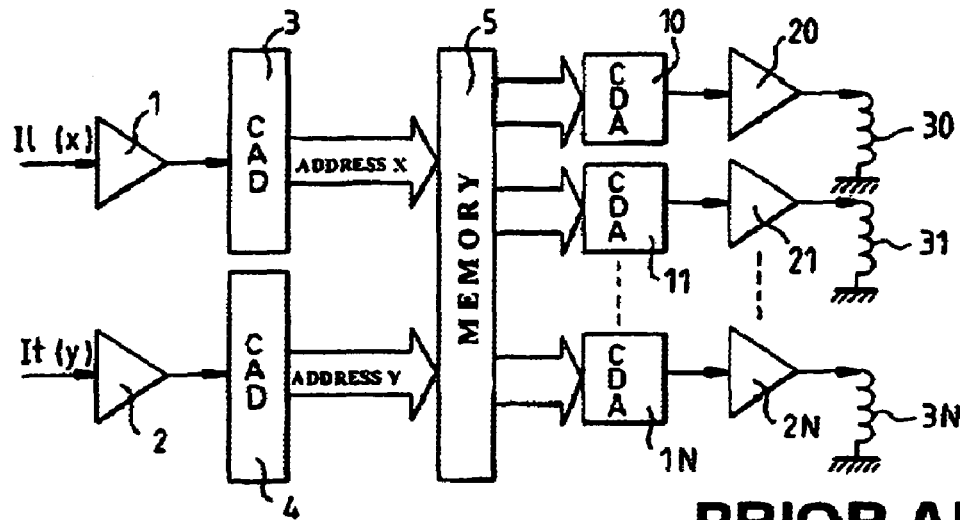
FIG. 1 illustrates a correction device according to the state of the art

FIG. 1 illustrates a known embodiment in which the image of the line and frame deflection currents are given respectively by sensors 1 and 2 which address analogue/digital converters 3 and 4 providing in digital form the horizontal and vertical addresses of the points of impact of the electron beams on the screen of the tube. These addresses are sent to the inputs of a correction memory 5 which as a function of the address will provide the correction data for bringing the points of impact to the desired places via digital/analogue converters 10, 11, 12 etc and amplifiers 20, 21, 22 etc supplying deflection field correction coils 30, 31, 32 etc.

Figure 2:
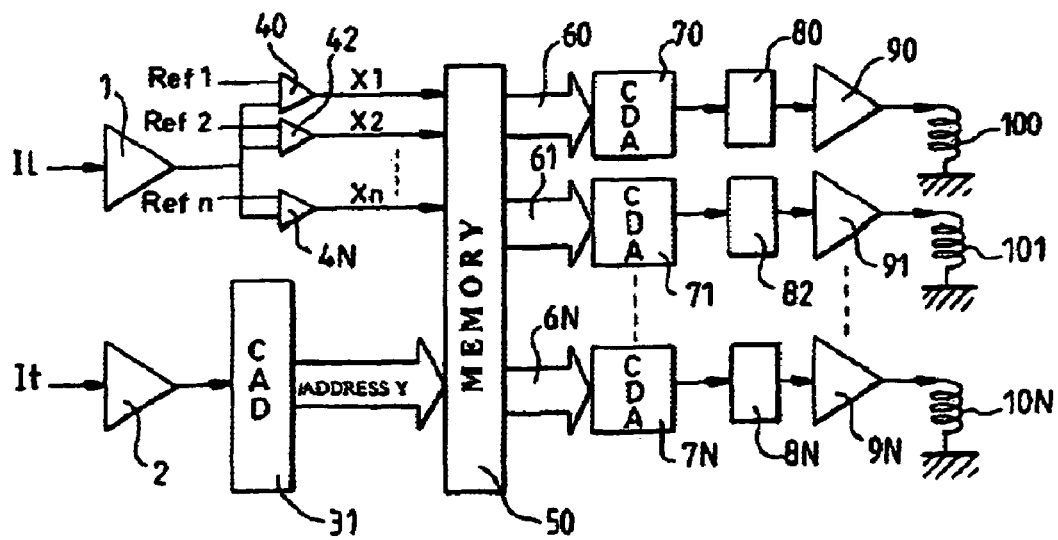
FIG. 2 illustrates a correction device according to the invention

FIG. 2 illustrates an embodiment of the invention, in which the reading of the horizontal address is performed by synchronous reading of the line scan current, this no longer giving rise to any instability visible to the viewer.

The frequency and the resolution of correction are in this case lower than with the previous solution, the latter is defined so as to obtain a number of corrections horizontally and vertically which is compatible with the eventual performance of the tube.

The number of corrections horizontally and vertically depends in fact on the type of tube, and the larger the correction, the more zones are necessary in order for the residual defects to be negligible to the viewer.

Within the context of the invention, the number of zones is chosen equal to 9×9 on the new tubes with reduced depth (that is to say with angle of deflection greater than 110°), this for tubes of average dimension; this number is not limiting and is chosen so as to provide an excellent compromise between the cost of the circuit and the performance to be achieved.

The fact of being synchronous with the line current therefore makes it possible to correct only 9 zones horizontally, this representing a working frequency of around 350 KHz calculated for a 2 H scan with a useful line duration of around 26 μs; in the configurations according to the state of the art with asynchronous correction, a larger frequency of around 10 MHz would have been needed.

According to the invention, it is directly the value of the line current which synchronously triggers the generating of the horizontal address at the input of the correction memory 50.

This function is carried out by virtue of N analogue comparators which will define N+1 correction zones. The value of the correction applied to the deflector therefore depends only on the value of the current therefore on the position of the point of impact of the beams on the screen of the tube regardless of the frequency of use of the deflector.

The correction zones are defined by the reference voltages applied to one of the inputs of the analogue comparators 40 to 4N, they might not be equidistant so as to concentrate the correction resolution in the most sensitive areas.

The reading of the frame current is performed asynchronously by virtue of a current sensor 2 whose analogue output is converted to digital by virtue of a converter 31 whose outputs address a correction memory 50.

For each area of the screen of the tube corresponding to an address delivered via the comparators 40 to 4N horizontally and by the converter 31 vertically, the correction memory 50 is programmed previously so as to contain one or more correction values 60 to 6N which after conversion to analogue through converters 70 to 7N whose conversion frequency must be around 350 KHz on 8 bits, filtering to smooth the instabilities of transitions due to the comparators (80 to 8N) and amplification (90 to 9N), will supply at least one coil (100 to 10N) of the device for deflecting the electron beams in order to generate the desired magnetic correction field.

Thus for example the data 60 provided by the memory 50 make it possible to send the coil 100 a correction value for the convergence of the electron beams while the data 61 provided by the memory make it possible to send the coil 101 a correction value for the geometry of the image formed on the screen of the tube.

The slightly noisy line current may give rise to an instability in the line address of the correction memory. Thanks to the method of addressing, a single bit may be noisy simultaneously, thereby causing an instability in the correction on reaching the reference voltage of the comparators. For one and the same screen point, the correction oscillates between two neighboring values. To avoid this problem, the device according to the invention disposes a filter of low-pass type, preferably of first order with a cut-off frequency at around 150 KHz at the level of the analogue outputs.

The invention does not use the comparator-based solution for the synchronous reading of the frame current, since the frame address instabilities cannot be filtered in analogue fashion on approaching the reference voltage. Specifically, thanks to the principle of television scanning, the corrections between lines whose frequency 2 H is around 100 Hz cannot be filtered in analogue fashion, the passband of the corrections is related to the line frequency since they are applied temporally line by line, an instability in the frame address would therefore cause a framewise correction instability.

The invention therefore favors asynchronous reading with an inexpensive converter whose sampling frequency is as a minimum chosen equal to the line frequency of the scan, that it to say between 16 KHz and 100 KHz with 256 correction possibilities, thereby offering a conventional resolution invisible to the eye of the viewer. The correction value will oscillate between 2 very close neighboring values which are therefore invisible to the eye since there will be 256 correction possibilities.

Figure 3:
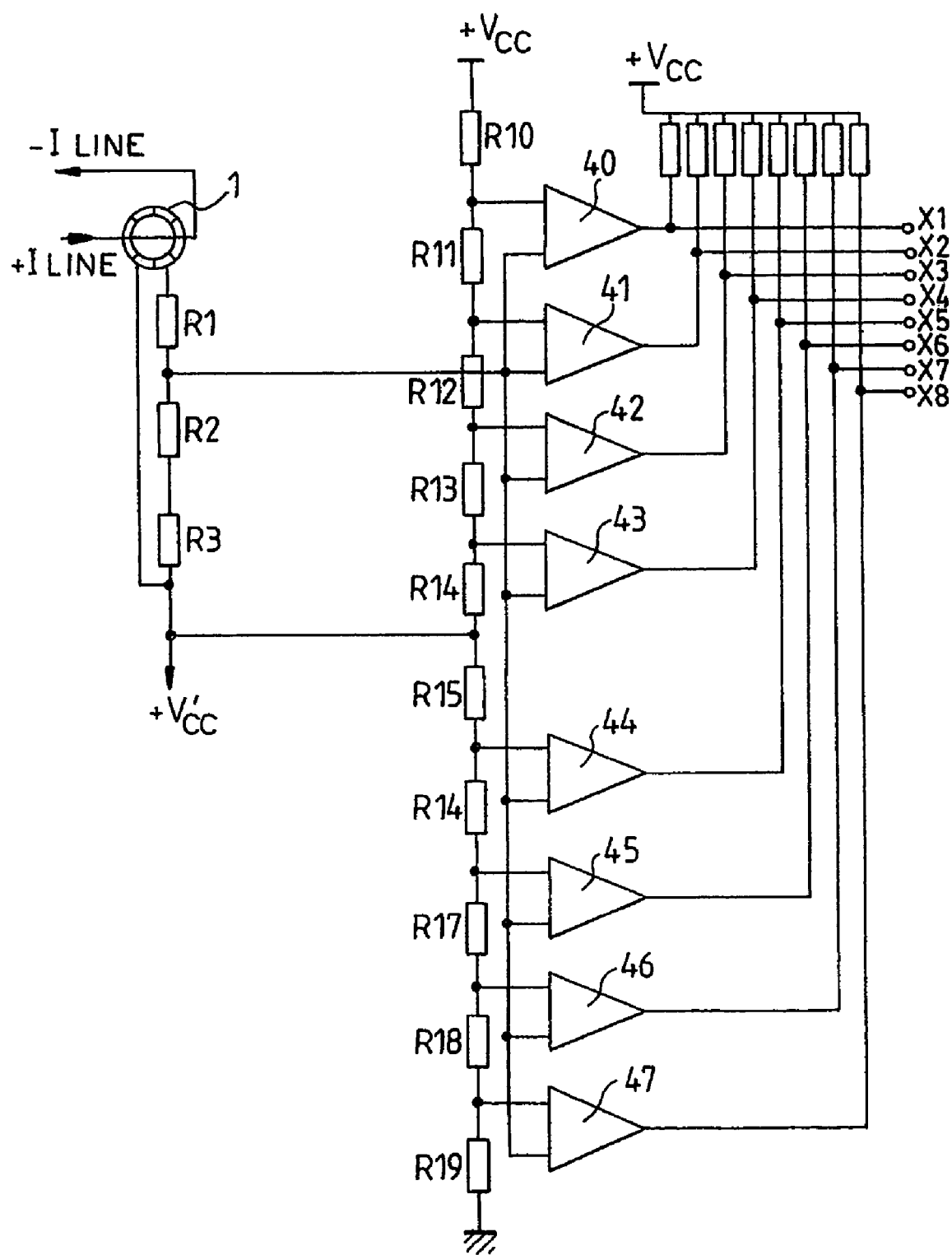
FIG. 3 illustrates an embodiment of the invention

FIG. 3 illustrates in detail the line current reading circuit; the line current sensor 1 may be an inductive sensor loaded by a resistive load composed by way of exemplary embodiment of three resistors R1,R2,R3; the voltage across the terminals of R2,R3 is applied to the (+) input of the operational amplifiers 40 to 47 while eight reference voltages are applied to the (−) inputs of the said amplifiers, by virtue of a divider bridge consisting of the resistors R10 to R19. The amplifiers 40 to 47 are thus [lacuna]. The outputs X1 to X8 form an eight-bit word which constitutes the horizontal address applied directly to the input of the correction memory.

The number of voltage references and hence of comparator amplifiers used in this example is not limiting; for tubes of very large dimension it may be useful to use a larger number of correction areas, thereby necessitating the use of a greater number of addresses.

By using corrections generated in synchronism with the line current of a deflector, the invention makes it possible to obtain an economical correction device with synchronous correction of the position of the points of impact of the beams on the screen and which does not therefore have to take account of the line scan frequency; moreover, the analogue/digital converter of the frame current must operate at least at the frame frequency, that is to say 100 Hz for a 2 H scan, this being a low frequency, thereby making it possible to reduce the cost of the correction circuit.

The invention claimed is:

1. Device for correcting a line field or a frame field or both of a deflector for cathode ray tube comprising:
   a current sensor for evaluating a value of the line current (Il);
   a series of comparators configured to compare the value of a line current (Il) with reference values;
   a current sensor for evaluating a value of a frame current (It);

an analogue/digital converter for converting an analogue value of the frame current;

a programmed correction memory which is addressed by output signals from the comparators and from the analogue/digital converter so as to deliver to at least one digital/analogue converter, data which are dependent on the addressing signals;

a low-pass filter for filtering an output of the at least one digital/analogue converter; and at least one correction coil for correcting the deflection fields of the deflector, generating a correction field as a function of the output value from the low-pass filter.

2. The correcting device according to claim 1, wherein a sampling frequency of the analogue/digital converter is at least equal to a line scan frequency of the deflector.

3. The device according to claim 1, wherein a cut-off frequency of the filter is around 150 KHz.

4. The device according to claim 1, wherein the at least one digital/analogue converter operates at a frequency of at least 350 KHz.

* * * * *